(12) United States Patent
Recio, III et al.

(10) Patent No.: US 11,891,873 B2
(45) Date of Patent: Feb. 6, 2024

(54) METHOD FOR WELLBORE SEALING

(71) Applicant: Halliburton Energy Services, Inc., Houston, TX (US)

(72) Inventors: Antonio Recio, III, Humble, TX (US); Julio Estuardo Vasquez Estrada, Kingwood, TX (US); Larry S. Eoff, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 140 days.

(21) Appl. No.: 17/350,140

(22) Filed: Jun. 17, 2021

(65) Prior Publication Data
US 2022/0403710 A1 Dec. 22, 2022

(51) Int. Cl.
| | |
|---|---|
| *C09K 8/512* | (2006.01) |
| *E21B 33/10* | (2006.01) |
| *C09K 8/504* | (2006.01) |
| *C09K 8/508* | (2006.01) |
| *C09K 8/514* | (2006.01) |

(52) U.S. Cl.
CPC ............ *E21B 33/10* (2013.01); *C09K 8/5045* (2013.01); *C09K 8/5083* (2013.01); *C09K 8/512* (2013.01); *C09K 8/514* (2013.01)

(58) Field of Classification Search
CPC ........ E21B 33/10; E21B 33/138; E21B 43/14; C09K 8/5045; C09K 8/5083; C09K 8/512; C09K 8/514
See application file for complete search history.

(56) References Cited

U.S. PATENT DOCUMENTS

| | | | |
|---|---|---|---|
| 9,771,773 B2 | 9/2017 | Reddy et al. | |
| 10,174,241 B2 | 1/2019 | Eoff et al. | |
| 2007/0227733 A1 | 10/2007 | Vercaemer et al. | |
| 2010/0036017 A1 | 2/2010 | Eoff et al. | |
| 2011/0114318 A1* | 5/2011 | Ezell ..................... | C09K 8/512 166/305.1 |

FOREIGN PATENT DOCUMENTS

| | | |
|---|---|---|
| EP | 0889197 A1 | 1/1999 |
| WO | 2019203810 A1 | 10/2019 |

OTHER PUBLICATIONS

International Search Report and Written Opinion in PCT/US2021/037928 dated Mar. 15, 2022.

* cited by examiner

Primary Examiner — Kumar R Bhushan
(74) Attorney, Agent, or Firm — Barnes & Thornburg LLP

(57) ABSTRACT

Methods and compositions for performing a sealing operation in a wellbore. An example method introduces a sealant composition into the wellbore while the sealant composition is under shear. The sealant composition comprises a thixotropic material, a conformance gel system, and an aqueous base fluid. The sealant composition is placed into a target location, and applied shear is reduced to the sealant composition when in the target location thereby allowing the sealant composition to thicken in the target location. Fluid flow across the target location is reduced by a fluid seal formed by the thickened sealant composition.

10 Claims, 3 Drawing Sheets

METHOD FOR WELLBORE SEALING

TECHNICAL FIELD

The present disclosure relates to the use of sealing compositions for wellbores, and more particularly, to the use of treating wells with a thixotropic sealing composition to shutoff undesired water and gas flow in wellbores as well as to seal off loss zones in the subterranean formations.

BACKGROUND

When performing a subterranean treatment operation it may sometimes be desirable to temporarily or permanently block or divert the flow of a fluid within at least a portion of the subterranean formation by forming a fluid seal therein. Illustrative fluid blocking and diversion operations can include, without limitation, zonal isolation, fluid loss control operations, kill operations, conformance control operations, and the like. The fluid that is being blocked or diverted may be a formation fluid that is natively present in the subterranean formation, such as petroleum, gas, or water.

Performing water and gas shutoff may be a complex issue, especially for horizontal wells and also wells with gravel pack screens or slotted liners. In these operations, placing sealant compositions in the desired location and having them remain stationary after placement may be difficult goal to achieve. For example, some sealant compositions are relatively low in viscosity. Depending on the density difference with the wellbore fluid, these sealant compositions will tend to either slump to the low side or rise to the high side of the wellbore after placement. If this occurs, the entire region around the wellbore may not be sealed completely. In addition, a pressure differential between annular zones may induce movement of the sealant compositions after placement. Moreover, some low viscosity sealant compositions may become diluted in the wellbore fluids. Provided are improved compositions and methods for performing sealing operations in wellbores.

BRIEF DESCRIPTION OF THE DRAWINGS

Illustrative examples of the present disclosure are described in detail below with reference to the attached drawing figures, which are incorporated by reference herein, and wherein.

Figure 1:
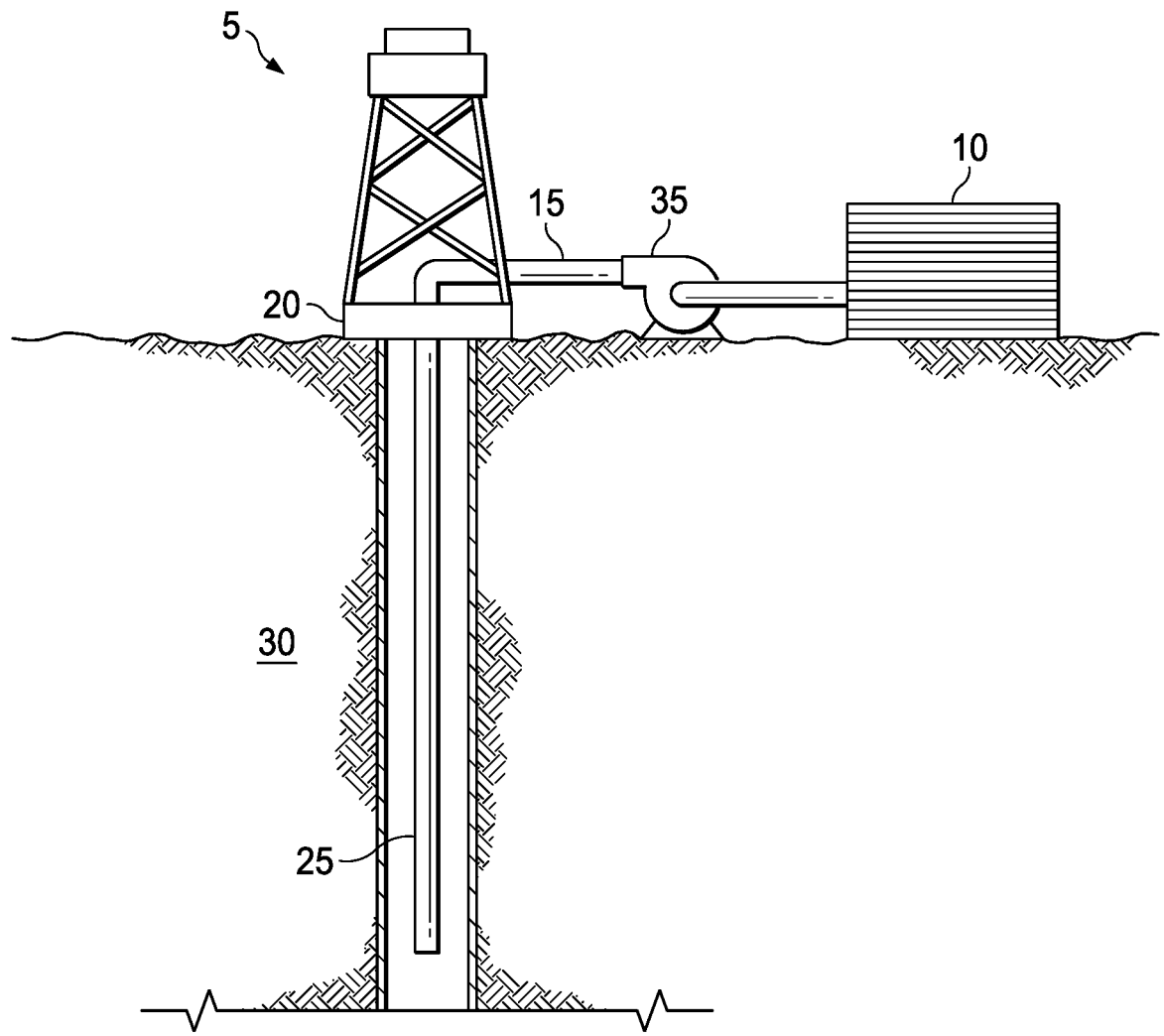
FIG. 1 is an illustrative schematic of a system for delivering a sealant composition to a downhole location, according to one or more examples in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of sealing compositions for wellbores, and more particularly, to the use of treating wells with a thixotropic sealing composition to shutoff undesired water and gas flow in wellbores as well as to seal off loss zones in the subterranean formations.

In the following detailed description of several illustrative examples, reference is made to the accompanying drawings that form a part hereof, and in which is shown by way of illustration examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples is defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

Examples of the apparatus and methods described herein relate to the use of sealant compositions for sealing off portions of a subterranean formation in a wellbore. Advantageously, the sealant compositions combine thixotropic materials with conformance gel systems to provide new thixotropic sealant compositions. The sealant compositions are capable of gaining viscosity rapidly when placed downhole. As such, the viscosified sealant compositions are better at filling the annular space evenly and are less likely to slump or rise to one side and thus incompletely fill the annular space. This may be of particular importance in horizontal wellbores which are more inclined to have issues with slumping or rising sealant compositions. Another advantage is that the viscosified sealant compositions are less likely to be diluted in wellbore fluids as they rapidly gain viscosity. Advantageously, the sealant compositions comprise thixotropic materials and conformance gel systems. Since the sealant compositions contain thixotropic materials, the sealant compositions are thixotropic as well, thereby allowing the sealant compositions to remain easily introducible into a wellbore in a low viscosity state, similar to the introduction state of the thixotropic materials alone. As used herein, the term "thixotropic" refers to fluid that has a low viscosity under a shearing force but undergoes a viscosity increase once the shearing force is lessened. That is, the sealant compositions described herein may be in a low viscosity state during their introduction under shear to the subterranean formation, and attain a higher viscosity state that supports the sealant composition after pumping is complete and the sealant composition has reached its intended location within the wellbore. An additional advantage is that the sealant compositions may be used for sealing operations in horizontal wellbores, vertical wellbores, deviated wellbores, etc. One further advantage is that the sealing compositions may be used to fill an open hole annular space, a gravel pack, a cased hole annular space, a screened annular space, etc. The sealing compositions may be pumped through tubing to a target zone, may be pumped through a drill bit to fill a loss zone, or may be introduced to an initial wellbore location and allowed to flow to a desired wellbore location. The sealing compositions may be used to seal off loss zones, water zones, gas zones, etc. The sealing compositions may be used for any wellbore operation in which a fluid seal is desired.

The sealant compositions described herein may be used in any water and/or gas shutoff operation for zonal isolation. In addition to these fluid sealing embodiments, the sealant compositions described herein may also be used in other types of treatment operations including, but not limited to, fracturing operations, gravel packing operations, and other stimulation operations, such as acidizing operations. Although the sealant compositions are described as being beneficial to horizontal wellbore operations to prevent slumping, sealant dilution, etc., it is to be understood that the sealant compositions may be used in any wellbore including vertical and deviated wellbores, and are not to be limited to horizontal wellbores.

In some examples, the sealant compositions described herein may have a viscosity of about 500 cP or less when shear is being applied thereto. At these viscosity levels, the sealant compositions may remain readily pumpable for introduction into a subterranean formation. Typical shear rates may be about 40 sec$^{-1}$ or more to attain such viscosity values. In some embodiments, the sealant compositions may have a viscosity of about 300 cP or less or about 200 cP or less when shear is being applied thereto. In still other embodiments, the sealant compositions may have a viscosity ranging between about 50 cP and about 200 cP or between about 100 cP and about 250 cP when shear is being applied thereto. The viscosity increases after shear is decreased or removed. After shear is decreased or removed, the final viscosity values may range between about 10,000 cP to about 100,000 cP. Higher final viscosity values are possible in some examples, such as about 100,000 cP to about 500,000 cP or about 100,000 cP to about 300 cP.

The sealant compositions comprise a thixotropic material. Examples of the thixotropic material include, but are not limited to, guar and guar derivatives such as hydroxyethyl guar, hydroxypropyl guar, carboxymethyl guar, carboxymethylhydroxyethyl guar, carboxymethylhydroxypropyl guar; combinations of guars and/or guar derivatives and diutan gum; synthetic smectite clays; polysaccharides such as xanthan, scleroglucan, succinoglycan, diutan, and cellulose derivatives (e.g., hydroxyethyl cellulose, carboxyethylcellulose, carboxymethylcellulose, and c arboxymethylhydroxyethylcellulose); cross-linked polysaccharides such as guar, guar derivatives, or cellulose derivatives that have been crosslinked with borate or with metal crosslinkers such as zirconates; terpolymers of 2-acrylamidomethyl propane sulfonic acid, acrylamide and acrylic acid; hydroxyethyl celluloses derivatized with vinyl phosphonic acids; or any combinations thereof.

The sealant compositions comprise a conformance gel system. Examples of the conformance gel system include, but are not limited to, colloidal silica; sodium silicate; polymers containing acrylamide; polyacrylamide; copolymers of acrylamide such as acrylamide and tertiary butyl acrylate, 2-acrylamidomethyl propane sulfonic acid, etc.; chitosan; copolymers of acrylamide and tertiary butyl acrylate cross-linked with polyvinylamine and/or polyvinyl alcohol; polyacrylamide cross-linked with polyvinylamine and/or polyvinyl alcohol; copolymers of acrylamide and tertiary butyl acrylate cross-linked with polyvinylamine/alcohol; polyacrylamide cross-linked with polyvinylamine/alcohol; a combination of MgO and MgCl·6H$_2$O; copolymers of 2-acrylamidomethyl propane sulfonic acid and N,N-dimethyl acrylamide; copolymers of 2-acrylamidomethyl propane sulfonic acid and acrylic acid; copolymers of 2-acrylamidomethyl propane sulfonic acid and itaconic acid; epoxide resins crosslinked with amines; or any combinations thereof.

A specific example of the sealant compositions comprises a combination of hydroxypropyl guar, diutan gum, and colloidal silica. Another specific example of the sealant composition comprises hydroxypropyl guar, diutan gum, and sodium silicate. An additional specific example of the sealant composition comprises hydroxypropyl guar, diutan gum, a copolymer of acrylamide and tertiary butyl acrylate, and chitosan. An additional specific example of the sealant composition comprises hydroxypropyl guar, diutan gum, a copolymer of acrylamide and tertiary butyl acrylate cross-linked with polyvinylamine and/or polyvinyl alcohol, and chitosan. A further specific example of the sealant composition comprises hydroxypropyl guar, diutan gum, polyacrylamide crosslinked with polyvinylamine and/or polyvinyl alcohol, and chitosan. One more specific example of the sealant composition comprises a synthetic smectite clay, colloidal silica, and a sodium silicate. Another specific example of the sealant composition comprises guar, guar derivatives or cellulose derivatives crosslinked with borate or with metal crosslinkers, colloidal silica, and sodium silicate. Another specific example of the sealant composition comprises guar, guar derivatives or cellulose derivatives crosslinked with borate or with metal crosslinkers, colloidal silica, sodium silicate, a copolymer of acrylamide and tertiary butyl acrylate crosslinked with polyvinylamine and/or polyvinyl alcohol, and polyacrylamide crosslinked with polyvinylamine and/or polyvinyl alcohol. Another specific example of the sealant composition comprises a synthetic smectite clay and MgO and MgCl·6H$_2$O. An additional specific example of the sealant composition comprises hydroxypropyl guar, diutan gum, a copolymer of 2-acrylamidomethyl propane sulfonic acid and N,N-dimethyl acrylamide, and chitosan. An additional specific example of the sealant composition comprises hydroxypropyl guar, diutan gum, a copolymer of 2-acrylamidomethyl propane sulfonic acid and N,N-dimethyl acrylamide crosslinked with polyvinylamine and/or polyvinyl alcohol. One additional specific example of the sealant composition comprises a terpolymer of 2-acrylamidomethyl propane sulfonic acid, acrylamide, and acrylic acid, and chitosan. An additional specific example of a sealant composition comprises hydroxypropyl guar, diutan gum, a copolymer of 2-acrylamidomethyl propane sulfonic acid and acrylic acid, and chitosan. An additional specific example of a sealant composition comprises hydroxypropyl guar, diutan gum, a copolymer of 2-acrylamidomethyl propane sulfonic acid and itaconic acid, and chitosan. An additional specific example of a sealant composition comprises hydroxypropyl guar, diutan gum, a copolymer of 2-acrylamidomethyl propane sulfonic acid and acrylic acid crosslinked with polyvinylamine and/or polyvinyl alcohol. An additional specific example of a sealant composition comprises hydroxypropyl guar, diutan gum, a copolymer of 2-acrylamidomethyl propane sulfonic acid and itaconic acid crosslinked with polyvinylamine and/or polyvinyl alcohol. A further specific example of the sealant composition comprises hydroxyethyl cellulose derivatized with vinyl phosphonic acid, colloidal silica, and sodium silicate. Another specific example of the sealant composition comprises a synthetic smectite clay and an expoxide resin crosslinked with amines.

Any of the disclosed thixotropic materials may be used with any of the disclosed conformance gel systems in any combination. It is to be understood that the disclosure is not limited to specific combinations of thixotropic materials and conformance gel systems. With the benefit of this disclosure, one or ordinary skill in the art will be readily able to select a thixotropic material and conformance gel system for preparation of a desired sealant composition.

The sealant compositions described herein comprise an aqueous base fluid. The aqueous base fluid may be from any source provided said source does not impede the functionality of the other treatment fluid components. Examples of the aqueous base fluid include, but are not limited to freshwater, brackish water, saline water, seawater, saturated saltwater, disposal water, recycled water, produced water, formation water, Ellenberger brines, the like, and any combinations thereof. One of ordinary skill in the art, with the benefit of this disclosure, should be readily able to select an aqueous base fluid for the preparation of the aqueous treatment fluid.

In some examples, the sealant composition comprises the thixotropic materials in a concentration of about 0.01% to about 10% by weight of the sealant compositions. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the thixotropic materials in the sealant composition may range from about 0.01% to about 0.1%, from about 0.01% to about 0.5%, from about 0.01% to about 1%, from about 0.01% to about 2%, from about 0.01% to about 3%, from about 0.01% to about 4%, from about 0.01% to about 5%, from about 0.01% to about 6%, from about 0.01% to about 7%, from about 0.01% to about 8%, from about 0.01% to about 9%, or from about 0.01% to about 10% by weight of the sealant composition. Alternatively, the thixotropic materials in the sealant composition may range from about may range from about 10% to about 9%, from about 10% to about 8%, from about 10% to about 7%, from about 10% to about 6%, from about 10% to about 5%, from about 10% to about 4%, from about 10% to about 3%, from about 10% to about 2%, from about 10% to about 1%, from about 10% to about 0.5%, from about 10% to about 0.1%, or from about 10% to about 0.01% by weight of the sealant composition. With the benefit of this disclosure, one of ordinary skill in the art will be readily able to prepare a sealant composition having a sufficient concentration of thixotropic materials for a given application.

In some examples, the sealant composition comprises the conformance gel systems in a concentration of about 0.1% to about 40% by weight of the sealant composition. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the conformance gel systems in the sealant composition may range from about 0.1% to about 0.5%, from about 0.1% to about 1%, from about 0.1% to about 5%, from about 0.1% to about 10%, from about 0.1% to about 15%, from about 0.1% to about 20%, from about 0.1% to about 25%, from about 0.1% to about 30%, from about 0.1% to about 35%, or from about 0.1% to about 40% by weight of the sealant composition. Alternatively, the conformance gel systems in the sealant composition may range from about 40% to about 35%, from about 40% to about 30%, from about 40% to about 25%, from about 40% to about 20%, from about 40% to about 15%, from about 40% to about 10%, from about 40% to about 5%, from about 40% to about 1%, from about 40% to about 0.5%, or from about 40% to about 0.1% by weight of the sealant composition. With the benefit of this disclosure, one of ordinary skill in the art will be readily able to prepare a sealant composition having a sufficient concentration of conformance gel systems for a given application.

In some examples, a crosslinking agent may be used. For example, if a guar, polysaccharide, or derivative is chosen as a thixotropic material, the thixotropic material may be cross-linked. Suitable crosslinking agents may include, but are not limited to, a metal ion cross-linker, a borate cross-linker, or any combination thereof. Suitable metal ion cross-linkers may include transition metal ions such as, for example, chromium, titanium, copper, and zirconium. Other transition metal ions may also induce crosslinking in a like manner Main group metal ions such as aluminum, for example, may also be used to induce crosslinking. Suitable borate crosslinking agents may include, for example, a borate ion or a multifunctional borate ion. In some examples of the gel conformance systems, the polymeric materials of the gel conformance system may be cross-linked. Examples of suitable cross-linkers include, but are not limited to polyvinylamines, amines, polyvinyl alcohols, polyvinylamine/alcohols, or combinations thereof.

In some embodiments, the sealant compositions described herein may further comprise at least one gel time modifier so as to tailor the gel times of the conformance gel system. Suitable gel time modifiers may be gel time accelerators or gel time retarders, depending on whether one wants to increase or decrease the rate of gelation for a particular application.

Suitable gel time modifiers may include, but are not limited to, pH-modifying agents such as, for example, inorganic acids, organic acids, organic salts, and inorganic salts. Illustrative examples of pH-modifying agents can include, for example, alkali metal carbonates, bicarbonates, acetates, formates, and hydroxides; organic acids (e.g., phenols and acetic acid); mineral acids (e.g., hydrochloric acid); and Lewis acids (e.g., boric acid). Illustrative gel time retarders that may be used include, for example, transition metal salts and acid anhydrides. Additional gel time modifiers may comprise a quaternary ammonium compound. Suitable quaternary ammonium compounds may include tetraalkylammonium salts. Illustrative tetraalkylammonium salts that may be suitable for use in the present embodiments can include, without limitation, tetramethylammonium halides, tetraethylammonium halides, tetrapropylammonium halides, tetrabutylammonium halides, mixtures thereof, and the like. The alkyl groups in the tetraalkylammonium salts can be either straight chain or branched. In some examples, the alkyl groups can be the same, and in other examples they can be different. Other suitable gel time modifiers may include, but are not limited to, an amino alcohol, an oligomeric polyamine having a molecular weight of less than about 400, any salt thereof, any derivative thereof, and any combination thereof. Specific examples of amino alcohols may include, for example, ethanolamine, diethanolamine, triethanolamine, propanolamine, any salt thereof, any derivative thereof, and any combination thereof. Specific examples of oligomeric polyamines may include, for example, diethylenetriamine, triethylenetetraamine, tetraethylenepentaamine, any salt thereof, any derivative thereof, and any combination thereof. Depending on their concentration in the sealant composition, among other factors, amino alcohols and oligomeric polyamines may either reduce or increase the gel time of the sealant composition.

In some optional examples, the sealant compositions described herein may optionally further comprise any number of additional additives commonly used in sealant compositions including, but not limited to, anti-oxidants, polymer degradation prevention additives, relative permeability modifiers, scale inhibitors, corrosion inhibitors, foaming agents, defoaming agents, antifoam agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., H2S scavengers, CO2 scavengers or O2 scavengers), lubricants, breakers, delayed release breakers, friction reducers, bridging agents, viscosifiers, weighting agents, solubilizers, pH control agents (e.g., buffers), hydrate inhibitors, consolidating agents, bactericides, and the like. Combinations of these additives may be used as well.

The sealant compositions described herein may be used in various subterranean treatment operations. Such treatment operations vary widely in scope and may include, for example, drilling operations, stimulation operations, remediation operations, and the like. In some examples, the sealant compositions may form a fluid seal after being introduced into a wellbore penetrating a subterranean formation and at least partially block the flow of a fluid therein. The fluid seal may block an aqueous fluid in some examples, or it may block a non-aqueous fluid in other examples. The fluid blocked by the fluid seal may comprise a formation fluid in some embodiments. In other various embodiments, a fluid seal may at least partially divert a fluid being introduced to the subterranean formation. At least partially blocking the flow of water in a subterranean formation with a fluid seal can decrease the production of water from the subterranean formation and/or allow less permeable zones of the subterranean formation to be treated with an aqueous treatment fluid, for example.

For some examples, the methods described may comprise providing a sealant composition comprising an aqueous base fluid, a thixotropic material, and a conformance gel system. The method may further comprise introducing the sealant composition into a wellbore penetrating a subterranean formation and viscosifying the sealant composition in the wellbore. The viscosified sealant composition may span the diameter of the wellbore and remain in place. The viscosified sealant composition may form a fluid seal in the wellbore.

In some optional examples, forming the viscosified sealant composition in the wellbore may comprise removing a shearing force from the sealant composition. That is, the sealant composition described herein may exhibit thixotropic behavior, such that they are in a low viscosity state when they are flowing but attain a high viscosity state when they are not. Accordingly, once the pumping of the sealant composition is halted, the sealant composition may attain a high viscosity state.

As discussed above, sealant composition described herein may attain a more uniform placement and distribution throughout the wellbore (e.g., by inhibiting slumping). In more specific examples, the sealant composition may be distributed substantially uniformly across the diameter of the wellbore and remain in place substantially without slumping. As used herein, the distribution of the sealant composition across the diameter of the wellbore will be considered to be "substantially uniform" if an amount of the sealant composition present at a given vertical or lateral wellbore position contains sufficient quantities of the sealant composition to form an intact fluid seal around the perimeter of the wellbore at that location. That is, some degree of non-uniformity in the sealant composition distribution in the wellbore may be tolerated within the bounds of still being able to form an intact fluid seal at a given wellbore location. For example, an intact fluid seal may completely shut off the flow of a fluid to or from a subterranean zone through which the wellbore passes.

In some examples, the wellbore may comprise a substantially horizontal section, and the sealant composition may be placed in the substantially horizontal section, such that it forms a fluid seal therein. As discussed above, slumping of a sealant composition in horizontal wellbores can be particularly problematic. It is to be recognized, however, that other wellbore configurations may also benefit from the sealant compositions described herein. For example, use of the sealant compositions described herein may allow a longer interval of a substantially vertical portion of a wellbore to have a fluid seal formed therein than would be possible if slumping were taking place.

In various examples, systems configured for delivering the sealant compositions described herein to a downhole location are described. In various examples, the systems can comprise a pump fluidly coupled to a tubular, the tubular containing a sealant composition for distribution downhole. The pump may be a high pressure pump. As used herein, the term "high pressure pump" will refer to a pump that is capable of delivering a fluid downhole at a pressure of about 1000 psi or greater. A high pressure pump may be used when it is desired to introduce the sealant composition to a subterranean formation at increased pressures. Suitable high pressure pumps will be known to one having ordinary skill in the art and may include, but are not limited to, floating piston pumps and positive displacement pumps.

In other examples, the pump may be a low pressure pump. As used herein, the term "low pressure pump" will refer to a pump that operates at a pressure of about 1000 psi or less. In some examples, a low pressure pump may be fluidly coupled to a high pressure pump that is fluidly coupled to the tubular. That is, in such embodiments, the low pressure pump may be configured to convey the sealant composition to the high pressure pump. In these examples, the low pressure pump may "step up" the pressure of the sealant composition before it reaches the high pressure pump.

In some examples, the systems described herein may comprise a mixing tank that is upstream of the pump and comprises a vessel in which the sealant composition is formulated. In various examples, the pump (e.g., a low pressure pump, a high pressure pump, or a combination thereof) may convey the sealant composition from the mixing tank or other vessel to the tubular. In other examples, the sealant composition may be formulated offsite and transported to a worksite, in which case the sealant composition may be introduced to the tubular via the pump directly from its shipping container (e.g., a truck, a railcar, a barge, or the like) or from a transport pipeline. In either case, the sealant composition may be drawn into the pump, elevated to an appropriate pressure, and then introduced into the tubular for delivery downhole.

FIG. 1 is an illustrative schematic of a system that can deliver the sealant compositions of the present disclosure to a downhole location, according to one or more examples. It should be noted that while FIG. 1 generally depicts a land-based system, it is to be recognized that like systems may be operated in subsea locations as well. As depicted in FIG. 1, system 5 may include mixing tank 10, in which a sealant composition of the present disclosure may be formulated. The sealant composition may be conveyed via line 15 to wellhead 20, where the treatment fluid enters tubular 25. Tubular 25 extends from wellhead 20 into subterranean formation 30. Tubular 25 may include orifices that allow the fluid to enter into a target area of the subterranean formation or be simply ejected from tubular 25. Upon being ejected from tubular 25, the sealant composition may disperse into the surrounding area, where it may viscosify and form a fluid seal of a portion of the subterranean formation 30. The fluid seal may prevent fluid loss, shut-off water, shut-off gas, etc. Pump 35 may be configured to raise the pressure of the sealant composition to a desired degree before its introduction into tubular 25. It is to be recognized that system 5 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Figure 2:
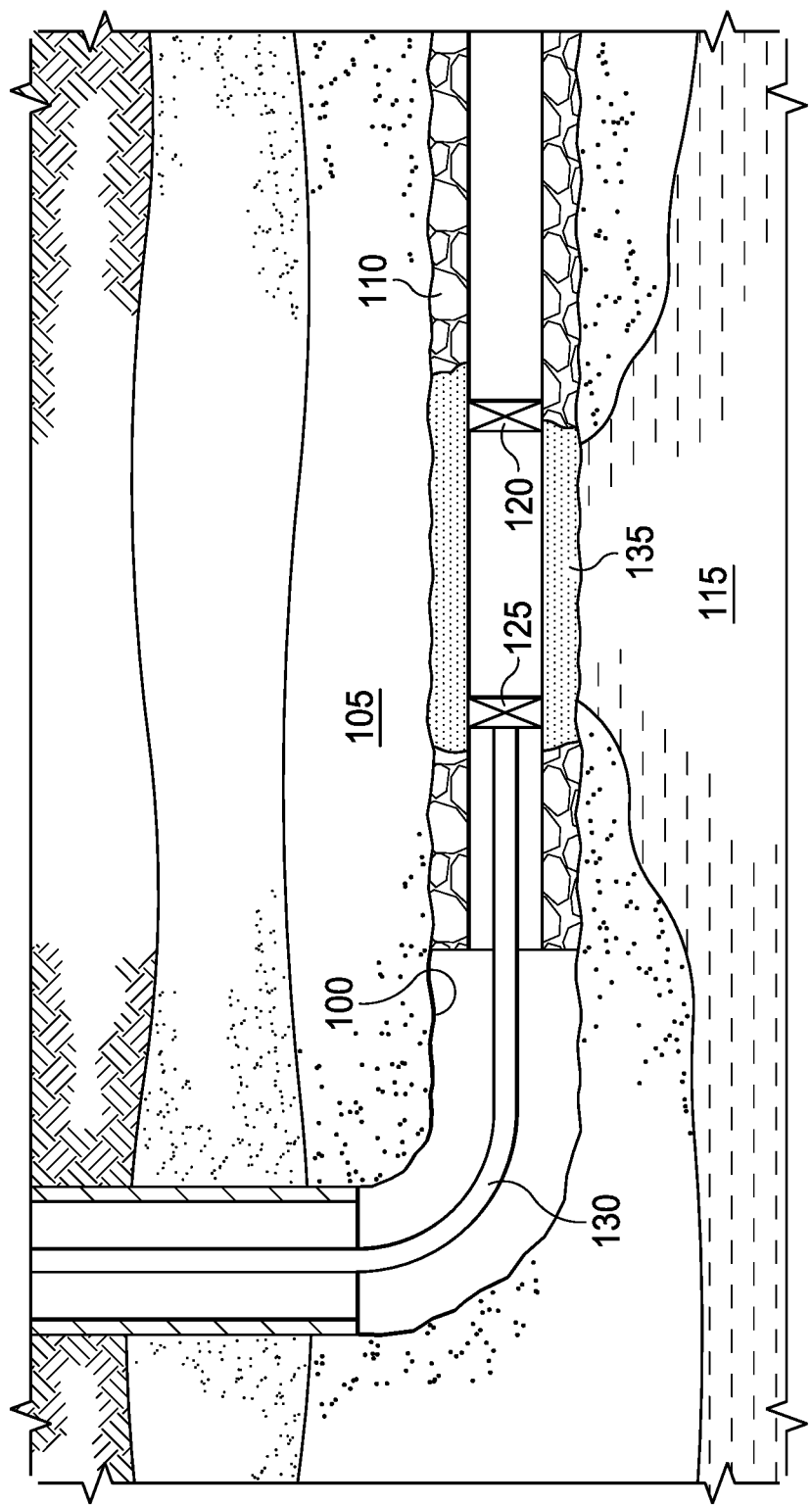
FIG. 2 is an illustrative schematic of an example horizontal wellbore with a gravel pack and water cresting after treatment with a sealant composition in accordance with the examples disclosed herein.

FIG. 2 is an illustrative schematic for using the sealant compositions disclosed herein for treating a horizontal well with a gravel pack and water cresting. Horizontal well 100 extends through a subterranean formation 105. A gravel pack 110 has been deposited and screened in place to fill the annular region of the horizontal well 100. Adjacent to a portion of the gravel pack 110 is a water zone 115. The water zone 115 releases water to the gravel pack 110, and this water release may impact production. In order to shut-off the water flow, a bridge plug 120 has placed inside the screen beyond the depth of the water encroachment. A retainer 125 has been placed, via coiled tubing 130, above the depth of the water encroachment. A sealant composition 135 has been pumped through the retainer 125 to fill the wellbore portion inside the screen, before moving into the gravel pack 110. The sealant composition 135 may prevent the migration of water from the water zone 115 into the gravel pack 110. As the sealant composition 135 is thixotropic, it is resistant to dilution in wellbore fluids and also thickens to remain in place once shear is removed. As such, the sealant compositions' 135 thixotropic nature allow for the sealant composition 135 to fill the annular space and resist slumping, rising, and dilution. Although FIG. 2 illustrates a screened-in gravel pack 110, it is to be understood that the sealant composition 135 may be used in wellbores without gravel packs, as well as open hole wellbores, cased holes, etc.

Figure 3:
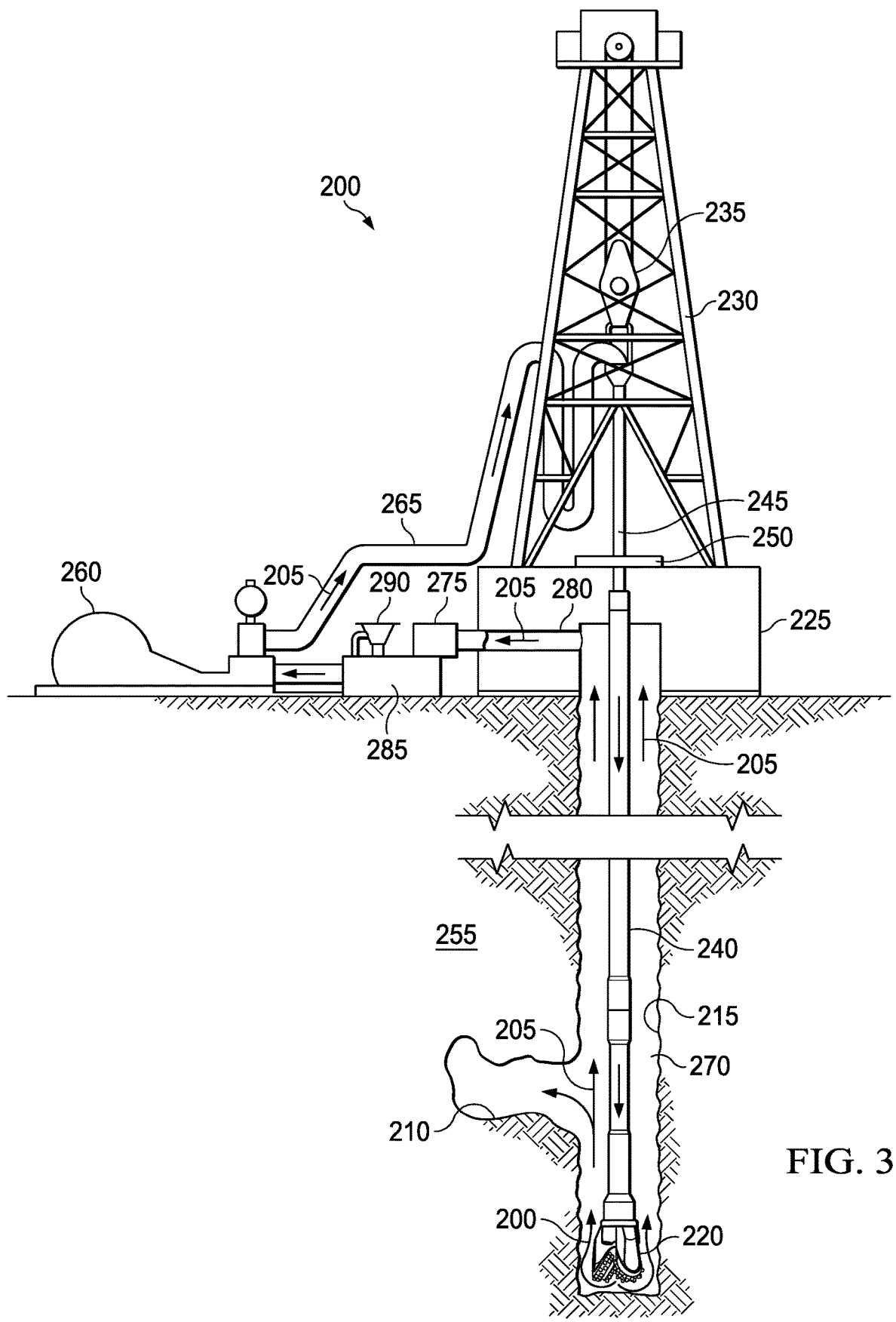
FIG. 3 is a schematic illustrating a system for using a sealant composition while drilling equipment is present in a wellbore in accordance with the examples disclosed herein.

FIG. 3 is a schematic illustrating a system, generally 200, for using a sealant composition 205, as described herein, while drilling equipment is present in a wellbore in accordance with the examples disclosed herein. FIG. 3 illustrates an example technique for the introduction of a sealant composition 205 into a lost circulation zone 210 while drilling equipment is present in a wellbore 215. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure. In this example, the sealant composition 205 is pumped downhole until it exits the bottom hole assembly 220 and is introduced into the lost circulation zone 210. When the sealant composition 205 is placed in the lost circulation zone 210, the sealant composition 205 may then be allowed to thicken within the lost circulation zone 210 as it is exposed to reduced shear once it penetrates the lost circulation zone 210.

With continued reference to FIG. 3, system 200 may include a drilling platform 225 that supports a derrick 230 having a traveling block 235 for raising and lowering a drill string 240. The drill string 240 may include, but is not limited to, drill pipe and coiled tubing, as generally known to those skilled in the art. A kelly 245 supports the drill string 240 as it is lowered through a rotary table 250. A bottom hole assembly 220 comprising a bit is attached to the distal end of the drill string 240 and is driven either by a downhole motor and/or via rotation of the drill string 240 from the well surface. As the bit of the bottom hole assembly 220 rotates, it creates a wellbore 215 that penetrates various subterranean formations 255.

A pump 260 (e.g., a mud pump) circulates a sealant composition 205 through a feed pipe 265 and to the kelly 245, which conveys the sealant composition 205 downhole through the interior of the drill string 240 and through one or more orifices in the bottom hole assembly 220. The sealant composition 205 may be introduced prior to, concurrently with, or subsequent to the introduction of a drilling fluid or other treatment fluid (not shown) into the wellbore 215. The sealant composition 205 may then contact lost circulation zone 210. The sealant composition 205 that contacts lost circulation zone 210 may no longer be exposed to sufficient shear force to remain fluid. Once static, the sealant composition 205 may thicken to seal lost circulation zone 210 and prevent the fluid loss of any subsequent circulating fluid. Any sealant composition 205 that does not contact a lost circulation zone 210 may be circulated back to the surface, either with or without the presence of another fluid (e.g., drilling fluid) via annulus 270 defined between the drill string 240 and the walls of the wellbore 215. At the surface, the recirculated sealant composition 205 exits the annulus 270 and may be conveyed to one or more fluid processing unit(s) 275 via an interconnecting flow line 280. After passing through the fluid processing unit(s) 275 the sealant composition 205 may be deposited into a nearby retention vessel 285. While illustrated as being arranged at the outlet of the wellbore 215 via the annulus 270, those skilled in the art will readily appreciate that the fluid processing unit(s) 275 may be arranged at any other location in the system 200 to facilitate its proper function, without departing from the scope of the disclosure.

The sealant composition 205 may be added to a mixing hopper 290 communicably coupled to or otherwise in fluid communication with the retention vessel 285. The mixing hopper 290 may include, but is not limited to, mixers and related mixing equipment known to those skilled in the art. In alternative examples, however, the sealant composition 205 may not be added to a mixing hopper 290. In at least one example, there could be more than one retention vessel 285, such as multiple retention vessel 285 in series. Moreover, the retention vessel 285 may be representative of one or more fluid storage facilities and/or units where the disclosed sealant compositions 205 may be stored, reconditioned, and/or regulated until desired for use.

The disclosed sealant compositions 205 may directly or indirectly affect the components and equipment of the system 100. For example, the disclosed sealant compositions 205 may directly or indirectly affect the fluid processing unit(s) 275 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 275 may further include one or more sensors, gauges, pumps, compressors, and the like used to store, monitor, regulate, and/or recondition the exemplary sealant compositions 205.

The sealant compositions 205 may directly or indirectly affect the pump 260, which representatively includes any conduits, pipelines, trucks, tubulars, and/or pipes used to fluidically convey the sealant compositions 205 downhole, any pumps, compressors, or motors (e.g., topside or downhole) used to drive the sealant compositions 205 into motion, any valves or related joints used to regulate the pressure or flow rate of the sealant compositions 205, and any sensors (e.g., pressure, temperature, flow rate, etc.), gauges, and/or combinations thereof, and the like. The disclosed sealant compositions 205 may also directly or indirectly affect the mixing hopper 290 and the retention vessel 285 and their assorted variations.

The disclosed sealant compositions 205 may also directly or indirectly affect the various downhole equipment and tools that may come into contact with the sealant compositions 205 such as, but not limited to, the drill string 240, any floats, drill collars, mud motors, downhole motors and/or pumps associated with the drill string 240, and any MWD/LWD tools and related telemetry equipment, sensors or distributed sensors associated with the drill string 240. The disclosed sealant compositions 205 may also directly or indirectly affect any downhole heat exchangers, valves and corresponding actuation devices, tool seals, packers and other wellbore isolation devices or components, and the like associated with the wellbore 215. The disclosed sealant compositions 205 may also directly or indirectly affect the drill bit of the bottom hole assembly 220, which may include, but is not limited to, roller cone bits, PDC bits, natural diamond bits, any hole openers, reamers, coring bits, etc.

While not specifically illustrated herein, the disclosed sealant compositions 205 may also directly or indirectly affect any transport or delivery equipment used to convey the sealant compositions 205 to the system 200 such as, for example, any transport vessels, conduits, pipelines, trucks, tubulars, and/or pipes used to fluidically move the sealant compositions 205 from one location to another, any pumps, compressors, or motors used to drive the sealant compositions 205 into motion, any valves or related joints used to regulate the pressure or flow rate of the sealant compositions 205, and any sensors (e.g., pressure and temperature), gauges, and/or combinations thereof, and the like.

It should be clearly understood that the examples illustrated by FIGS. 1-3 are merely general applications of the principles of this disclosure in practice, and a wide variety of other examples are possible. Therefore, the scope of this disclosure is not limited in any manner to the details of any of the FIGURES described herein.

It is also to be recognized that the disclosed sealant compositions may also directly or indirectly affect the various downhole equipment and tools that may come into contact with the sealant compositions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in any of the FIGURES.

Provided are methods for performing a sealing operation in a wellbore in accordance with the disclosure and the illustrated FIGURES. An example method comprises introducing a sealant composition into the wellbore while the sealant composition is under shear, the sealant composition comprising: a thixotropic material, a conformance gel system, and an aqueous base fluid. The method further comprises placing the sealant composition into a target location, reducing shear applied to the sealant composition when in the target location thereby allowing the sealant composition to thicken in the target location, and reducing fluid flow across the target location with a fluid seal formed by the thickened sealant composition.

Additionally or alternatively, the method may include one or more of the following features individually or in combination. The thixotropic material may comprise a material selected from the group consisting of guar, a guar derivative, a synthetic smectite clay, a polysaccharide, cellulose, a cellulose derivative, and any combination thereof. The thixotropic material may be hydroxyethyl guar, hydroxypropyl guar, carboxymethyl guar, carboxymethylhydroxyethyl guar, carboxymethylhydroxypropyl guar, a combination of guar and diutan gum, a combination of a guar derivative and diutan gum, xanthan, scleroglucan, succinoglycan, diutan, hydroxyethyl cellulose, carboxyethylcellulose, carboxymethylcellulose, carboxymethylhydroxyethylcellulose, a cross-linked polysaccharide, a terpolymer of 2-acrylamidomethyl propane sulfonic acid, acrylamide and acrylic acid, a hydroxyethyl cellulose derivatized with a vinyl phosphonic acid, or any combination thereof. The conformance gel system may comprise a material selected from the group consisting of a colloidal silica, a sodium silicate, a polymer containing acrylamide, a polyacrylamide, a copolymer of acrylamide, a chitosan, a combination of MgO and MgCl·6H$_2$O, a crosslinked epoxide resin, and any combination thereof. The conformance gel system may be a copolymer of acrylamide and tertiary butyl acrylate, 2-acrylamidomethyl propane sulfonic acid, a copolymer of acrylamide and tertiary butyl acrylate cross-linked with polyvinylamine, a copolymer of acrylamide and tertiary butyl acrylate cross-linked with polyvinyl alcohol, a copolymer of acrylamide and tertiary butyl acrylate cross-linked with polyvinylamine/alcohol, a polyacrylamide cross-linked with polyvinylamine/alcohol, a polyacrylamide cross-linked with polyvinylamine, a polyacrylamide cross-linked with polyvinyl alcohol, a combination of MgO and MgCl·6H$_2$O, a copolymer of 2-acrylamidomethyl propane sulfonic acid and N,N-dimethyl acrylamide, a copolymer of 2-acrylamidomethyl propane sulfonic acid and acrylic acid, a copolymer of 2-acrylamidomethyl propane sulfonic acid and itaconic acid, or any combination thereof. The sealant composition may comprise a viscosity of about 500 cP or less when shear is being applied during the introducing of the sealant composition into the wellbore. The sealant composition may comprise a viscosity of about 10,000 cP to about 100,000 cP during the reducing shear applied to the sealant composition. The target location may be a lost circulation zone. The target location may be an annulus of a horizontal wellbore. The target location may comprise a gravel pack.

Provided are sealant compositions for forming a seal in a wellbore in accordance with the disclosure and the illustrated FIGURES. An example sealing composition comprises a thixotropic material, a conformance gel system, and an aqueous base fluid.

Additionally or alternatively, the sealant composition may include one or more of the following features individually or in combination. The thixotropic material may comprise a material selected from the group consisting of guar, a guar derivative, a synthetic smectite clay, a polysaccharide, cellulose, a cellulose derivative, and any combination thereof. The thixotropic material may be hydroxyethyl guar, hydroxypropyl guar, carboxymethyl guar, carboxymethylhydroxyethyl guar, carboxymethylhydroxypropyl guar, a combination of guar and diutan gum, a combination of a guar derivative and diutan gum, xanthan, scleroglucan, succinoglycan, diutan, hydroxyethyl cellulose, carboxyethylcellulose, carboxymethylcellulose, carboxymethylhydroxyethylcellulose, a cross-linked polysaccharide, a terpolymer of 2-acrylamidomethyl propane sulfonic acid, acrylamide and acrylic acid, a hydroxyethyl cellulose derivatized with a vinyl phosphonic acid, or any combination thereof. The conformance gel system may comprise a material selected from the group consisting of a colloidal silica, a sodium silicate, a polymer containing acrylamide, a polyacrylamide, a copolymer of acrylamide, a chitosan, a combination of MgO and MgCl·6H$_2$O, a crosslinked epoxide resin, and any combination thereof. The conformance gel system may be a copolymer of acrylamide and tertiary butyl acrylate, 2-acrylamidomethyl propane sulfonic acid, a copolymer of acrylamide and tertiary butyl acrylate cross-linked with polyvinylamine, a copolymer of acrylamide and tertiary butyl acrylate cross-linked with polyvinyl alcohol, a copolymer of acrylamide and tertiary butyl acrylate cross-linked with polyvinylamine/alcohol, a polyacrylamide cross-linked with polyvinylamine/alcohol, a polyacrylamide cross-linked with polyvinylamine, a polyacrylamide cross-linked with polyvinyl alcohol, a combination of MgO and MgCl·6H$_2$O, a copolymer of 2-acrylamidomethyl propane sulfonic acid and N,N-dimethyl acrylamide, a copolymer of 2-acrylamidomethyl propane sulfonic acid and acrylic acid, a copolymer of 2-acrylamidomethyl propane sulfonic acid and itaconic acid, or any combination thereof. The sealant composition may comprise a viscosity of about 500 cP or less when shear is being applied during the introducing of the sealant composition into the wellbore. The sealant composition may comprise a viscosity of about 10,000 cP to about 100,000 cP during the reducing shear applied to the sealant composition.

Provided are systems for forming a seal in a wellbore in accordance with the disclosure and the illustrated FIGURES. An example system comprises a sealant composition comprising: a thixotropic material, a conformance gel system, and an aqueous base fluid. The system further comprises a pump fluidically connected to a tubular and configured to introduce the sealant composition into the wellbore.

Additionally or alternatively, the system may include one or more of the following features individually or in combination. The system may further comprise a gravel pack and wherein the tubular is configured to convey the sealant composition into the gravel pack. The system may further comprise a bottom hole assembly configured to convey the sealant composition into the wellbore. The thixotropic material may comprise a material selected from the group consisting of guar, a guar derivative, a synthetic smectite clay, a polysaccharide, cellulose, a cellulose derivative, and any combination thereof. The thixotropic material may be hydroxyethyl guar, hydroxypropyl guar, carboxymethyl guar, carboxymethylhydroxyethyl guar, carboxymethylhydroxypropyl guar, a combination of guar and diutan gum, a combination of a guar derivative and diutan gum, xanthan, scleroglucan, succinoglycan, diutan, hydroxyethyl cellulose, carboxyethylcellulose, carboxymethylcellulose, carboxymethylhydroxyethylcellulose, a cross-linked polysaccharide, a terpolymer of 2-acrylamidomethyl propane sulfonic acid, acrylamide and acrylic acid, a hydroxyethyl cellulose derivatized with a vinyl phosphonic acid, or any combination thereof. The conformance gel system may comprise a material selected from the group consisting of a colloidal silica, a sodium silicate, a polymer containing acrylamide, a polyacrylamide, a copolymer of acrylamide, a chitosan, a combination of MgO and MgCl·6H$_2$O, a crosslinked epoxide resin, and any combination thereof. The conformance gel system may be a copolymer of acrylamide and tertiary butyl acrylate, 2-acrylamidomethyl propane sulfonic acid, a copolymer of acrylamide and tertiary butyl acrylate cross-linked with polyvinylamine, a copolymer of acrylamide and tertiary butyl acrylate cross-linked with polyvinyl alcohol, a copolymer of acrylamide and tertiary butyl acrylate cross-linked with polyvinylamine/alcohol, a polyacrylamide cross-linked with polyvinylamine/alcohol, a polyacrylamide cross-linked with polyvinylamine, a polyacrylamide cross-linked with polyvinyl alcohol, a combination of MgO and MgCl·6H$_2$O, a copolymer of 2-acrylamidomethyl propane sulfonic acid and N,N-dimethyl acrylamide, a copolymer of 2-acrylamidomethyl propane sulfonic acid and acrylic acid, a copolymer of 2-acrylamidomethyl propane sulfonic acid and itaconic acid, or any combination thereof. The sealant composition may comprise a viscosity of about 500 cP or less when shear is being applied during the introducing of the sealant composition into the wellbore. The sealant composition may comprise a viscosity of about 10,000 cP to about 100,000 cP during the reducing shear applied to the sealant composition.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for performing a sealing operation in a wellbore comprising:
    introducing a sealant composition into the wellbore while the sealant composition is under shear, the sealant composition comprising:
        a thixotropic material,
        a conformance gel system, and
        an aqueous base fluid;
    placing the sealant composition into a target location, wherein the target location is an annulus of the wellbore; wherein the annulus is adjacent to a water zone of a subterranean formation;
    reducing shear applied to the sealant composition when in the target location thereby allowing the sealant composition to thicken in the target location, and
    reducing fluid flow across the target location with a fluid seal formed by the thickened sealant composition; thereby reducing water flow into the annulus from the water zone.

2. The method of claim 1, wherein the thixotropic material comprises a material selected from the group consisting of guar, a guar derivative, a synthetic smectite clay, a polysaccharide, cellulose, a cellulose derivative, and any combination thereof.

3. The method of claim 2, wherein the thixotropic material is hydroxyethyl guar, hydroxypropyl guar, carboxymethyl guar, carboxymethylhydroxyethyl guar, carboxymethylhydroxypropyl guar, a combination of guar and diutan gum, a combination of a guar derivative and diutan gum, xanthan, scleroglucan, succinoglycan, diutan, hydroxyethyl cellulose, carboxyethylcellulose, carboxymethylcellulose, carboxymethylhydroxyethylcellulose, a cross-linked polysaccharide, a terpolymer of 2-acrylamidomethyl propane sulfonic acid, acrylamide and acrylic acid, a hydroxyethyl cellulose derivatized with a vinyl phosphonic acid, or any combination thereof.

4. The method of claim 1, wherein the conformance gel system comprises a material selected from the group consisting of a colloidal silica, a sodium silicate, a polymer containing acrylamide, a polyacrylamide, a copolymer of acrylamide, a chitosan, a combination of MgO and $MgCl \cdot 6H_2O$, a crosslinked epoxide resin, and any combination thereof.

5. The method of claim 4, wherein the conformance gel system is a copolymer of acrylamide and tertiary butyl acrylate, 2-acrylamidomethyl propane sulfonic acid, a copolymer of acrylamide and tertiary butyl acrylate cross-linked with polyvinylamine, a copolymer of acrylamide and tertiary butyl acrylate cross-linked with polyvinyl alcohol, a copolymer of acrylamide and tertiary butyl acrylate cross-linked with polyvinylamine/alcohol, a polyacrylamide cross-linked with polyvinylamine/alcohol, a polyacrylamide cross-linked with polyvinylamine, a polyacrylamide cross-linked with polyvinyl alcohol, a combination of MgO and $MgCl \cdot 6H_2O$, a copolymer of 2-acrylamidomethyl propane sulfonic acid and N,N-dimethyl acrylamide, a copolymer of 2-acrylamidomethyl propane sulfonic acid and acrylic acid, a copolymer of 2-acrylamidomethyl propane sulfonic acid and itaconic acid, or any combination thereof.

6. The method of claim 1, wherein the sealant composition comprises a viscosity of about 500 cP or less when shear is being applied during the introducing of the sealant composition into the wellbore.

7. The method of claim 1, wherein the sealant composition comprises a viscosity of about 10,000 cP to about 100,000 cP during the reducing shear applied to the sealant composition.

8. The method of claim 1, wherein the target location is a lost circulation zone.

9. The method of claim 1, wherein the wellbore is a horizontal wellbore.

10. The method of claim 1, wherein the target location comprises a gravel pack.

* * * * *